(12) United States Patent
Sano

(10) Patent No.: US 10,921,503 B2
(45) Date of Patent: Feb. 16, 2021

(54) WAVELENGTH VARIABLE INTERFERENCE FILTER AND OPTICAL MODULE

(71) Applicant: Seiko Epson Corporation, Tokyo (JP)

(72) Inventor: Akira Sano, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/922,029

(22) Filed: Jul. 7, 2020

(65) Prior Publication Data

US 2020/0333519 A1 Oct. 22, 2020

Related U.S. Application Data

(63) Continuation of application No. 15/896,460, filed on Feb. 14, 2018, now Pat. No. 10,746,909.

(30) Foreign Application Priority Data

Feb. 28, 2017 (JP) .................................. 2017-037645

(51) Int. Cl.
| | |
|---|---|
| *G02B 5/26* | (2006.01) |
| *G02B 5/28* | (2006.01) |
| *G01J 3/26* | (2006.01) |
| *G02B 26/00* | (2006.01) |

(52) U.S. Cl.
CPC .................. *G02B 5/28* (2013.01); *G01J 3/26* (2013.01); *G02B 5/26* (2013.01); *G02B 5/284* (2013.01); *G02B 26/001* (2013.01)

(58) Field of Classification Search
CPC .. G02B 5/26; G02B 5/28; G02B 5/284; G01J 3/26

(Continued)

(56) References Cited

U.S. PATENT DOCUMENTS

| | | |
|---|---|---|
| 7,734,131 B2 | 6/2010 | Lin et al. |
| 8,687,254 B2 | 4/2014 | Hanamura et al. |

(Continued)

FOREIGN PATENT DOCUMENTS

| | | |
|---|---|---|
| JP | 02-257676 A | 10/1990 |
| JP | 2002-062505 A | 2/2002 |

(Continued)

OTHER PUBLICATIONS

Extended European Search Report for Application No. EP 18 15 8844 dated Jul. 3, 2018 (9 pages).

(Continued)

*Primary Examiner* — Kevin K Pyo
(74) *Attorney, Agent, or Firm* — Harness, Dickey & Pierce, P.L.C.

(57) ABSTRACT

A wavelength variable interference filter includes: a first substrate on which a first reflection film is formed; and a second substrate that includes a movable portion on which a second reflection film facing the first reflection film is formed and a holding portion surrounding an outer circumference of the movable portion and holding the movable portion so that the movable portion is displaceable in a thickness direction of the second reflection film. The movable portion has long and short sides in a plan view. The holding portion includes a long-side holding portion formed along the long side and a short-side holding portion formed along the short side. The rigidity of the short-side holding portion is lower than the rigidity of the long-side holding portion.

16 Claims, 12 Drawing Sheets

(58) Field of Classification Search
USPC .................................................. 250/216, 226
See application file for complete search history.

(56) References Cited

U.S. PATENT DOCUMENTS

| | | |
|---|---|---|
| 9,195,047 B2 | 11/2015 | Hanamura et al. |
| 9,753,199 B2 | 9/2017 | Nishimura et al. |
| 2010/0142067 A1 | 6/2010 | Hanamura et al. |
| 2014/0111811 A1 | 4/2014 | Tuohiniemi |
| 2014/0153098 A1 | 6/2014 | Hanamura et al. |
| 2016/0187197 A1 | 6/2016 | Hirokubo et al. |
| 2016/0370230 A1 | 12/2016 | Nishimura |
| 2018/0246264 A1* | 8/2018 | Sano .................... G02B 26/001 |

FOREIGN PATENT DOCUMENTS

| | | |
|---|---|---|
| JP | 2003-185941 A | 7/2003 |
| JP | 2010-139552 A | 6/2010 |
| JP | 2012-108371 A | 6/2012 |
| JP | 2016-125820 A | 7/2016 |
| JP | 2017-009635 A | 1/2017 |
| WO | 2012-168545 A1 | 12/2012 |

OTHER PUBLICATIONS

Byron A. Walmsley et al., "Design and Optimisation of a MEMS-Based Tunable Fabry-Perot Infrared Filter", Optoelectronic and Microelectronic Materials and Devices, 2006 Conference, IEEE, PI Dec. 1, 2006, pp. 272-275.

\* cited by examiner

WAVELENGTH VARIABLE INTERFERENCE FILTER AND OPTICAL MODULE

CROSS-REFERENCE TO RELATED APPLICATIONS

This application is a continuation of U.S. patent application Ser. No. 15/896,460, filed Feb. 14, 2018 which claims priority to Japanese Patent Application No. 2017-037645, filed Feb. 28, 2017, both of which are hereby expressly incorporated by reference herein in their entireties.

BACKGROUND

1. Technical Field

The present invention relates to a wavelength variable interference filter and an optical module.

2. Related Art

In the related art, there is a wavelength variable interference filter that includes a pair of reflection films (for example, see JP-A-2010-139552).

In such a wavelength variable interference filter, a movable portion on which the reflection film is installed and a holding portion which surrounds the outer circumference of the movable portion and holds the movable portion so that the movable portion is displaceable are formed in a substrate. When the movable portion is displaced, a gap amount between a pair of reflection films is changed. Thus, the light that is transmitted through the wavelength variable interference filter can be controlled based on its wavelength relative to the gap amount.

Incidentally, the wavelength variable interference filter can be combined for use with a light receiving sensor that receives light transmitted through the wavelength variable interference filter. Therefore, when a light receiving surface of the light receiving sensor is rectangular or square, the planar shapes of the reflection film and the movable portion are also rectangular or square. However, when the movable portion is rectangular or square, the following problem occurs.

To prevent the reflection films from being bent, displacement is necessary without bending the movable portion.

However, when applying a force to a flat plate in its thickness direction while the sides of the flat plate are fixed, a displacement amount of a central portion is larger than a displacement amount of a periphery portion. If we define a difference of the magnitude of displacement amounts as a "bending amount", when rigidity of the holding portion is uniform, the bending amount of the movable portion in a longer side direction is larger than a bending amount of the movable portion in the shorter side direction. Therefore, the gap amount is irregular in the plane of the reflection film.

When the movable portion is rectangular or square, it is more difficult for a portion of the holding portion contacting with a corner of the movable portion to be bent than other portions of the holding portion. For this reason, when the movable portion is displaced, there is a problem that a corner portion of the movable portion is drawn by the holding portion and the movable portion is easily bent compared to when the movable portion is in a circular shape.

Further, when the movable portion is bent as described above, there is a problem that the reflection film is also bent, the wavelength of light output from the wavelength variable interference filter varies in a plane of the reflection film, and the precision of the wavelength variable interference filter degrades.

SUMMARY

An advantage of some aspects of the invention is that it provides a wavelength variable interference filter and an optical module capable of suppressing the degradation of the precision of the wavelength variable interference filter due to the bending of a movable portion.

A wavelength variable interference filter according to an application example of the invention includes: a first substrate on which a first reflection film is formed; and a second substrate that includes a movable portion on which a second reflection film facing the first reflection film is formed and a holding portion surrounding an outer circumference of the movable portion, and holding the movable portion so that the movable portion is displaceable in a thickness direction of the second reflection film. The movable portion includes long and short sides in a plan view. The holding portion includes a long-side holding portion formed along the long side and a short-side holding portion formed along the short side. The rigidity of the short-side holding portion is lower than rigidity of the long-side holding portion.

In this application example, the rigidity of the short-side holding portion is lower than the rigidity of the long-side holding portion. In this configuration, compared to a case in which the rigidity of the short-side holding portion is the same as the rigidity of the long-side holding portion, the short-side holding portion is easily bent when the movable portion is displaced. Thus, a force by which the short-side holding portion draws the movable portion is relatively weak. Therefore, it is possible to reduce the bending of the movable portion in the long-side direction. Accordingly, it is possible to also suppress bending of the second movable reflection film formed on the movable portion, it is possible to suppress a variation in an output wavelength in the plane of the second movable reflection film, and thus it is possible to realize the wavelength variable interference filter with high precision.

In the wavelength variable interference filter according to the application example, it is preferable that the rigidity of the long-side holding portion is progressively lowered in a direction along the long side as a distance from a center of the movable portion increases. The rigidity of the long-side holding portion is progressively lowered in the direction along the long side as the distance from a normal of the long side passing through the center of the movable portion increases.

When the rigidity of the holding portion is uniform, a displacement amount of the movable portion is smaller as a distance from the center in the long-side direction increases. In the application example, however, when the movable portion is displaced, the long-side holding portion is easily bent at a position at which the distance from the center is longer, that is, a position at which the distance from the normal of the long side passing through the center of the movable portion is longer in the direction along the long side. Thus, a force drawing the movable portion by the holding portion is relatively weak.

Therefore, it is possible to cause a displacement amount of the movable portion to be constant in the long-side direction, and thus it is possible to reduce the bending of the movable portion in the long-side direction.

In the wavelength variable interference filter according to the application example, it is preferable that the rigidity of the short-side holding portion is progressively lowered in a direction along the short side as a distance from the center of the movable portion increases. The rigidity of the short-side holding portion is progressively lowered in the direction along the short side as the distance from a normal of the short side passing through the center of the movable portion increases.

When the rigidity of the holding portion is uniform, a displacement amount of the movable portion is smaller as a distance from the center in the short-side direction increases. In the application example, however, when the movable portion is displaced, the short-side holding portion is easily bent at a position at which the distance from the center is longer, that is, a position at which the distance from the normal of the short side passing through the center of the movable portion increases in the direction along the short side. Thus, a force drawing the movable portion by the holding portion is relatively weak.

Therefore, it is possible to cause a displacement amount of the movable portion to be constant in the short-side direction, and thus it is possible to reduce the bending of the movable portion in the short-side direction.

In the wavelength variable interference filter according to the application example, it is preferable that the holding portion includes a corner holding portion that is disposed in a region surrounded by a pair of lines formed along the long sides in contact with a circumference of the long-side holding portion close to the movable portion and an outer circumference opposite to the circumference of the long-side holding portion and a pair of lines formed along the short sides in contact with a circumference of the short-side holding portion close to the movable portion and an outer circumference opposite to the circumference of the short-side holding portion. The rigidity of the corner holding portion is preferably lower than the rigidity of the long-side holding portion and the short-side holding portion.

According to the application example with this configuration, compared to a case in which the rigidity of the corner holding portion is the same as the rigidity of the long-side holding portion or the short-side holding portion, the corner holding portion is easily bent when the movable portion is displaced. Thus, a force by which the corner holding portion drawing the movable portion is relatively weak. Therefore, the movable portion is rarely bent.

In the wavelength variable interference filter according to the application example, it is preferable that a thickness of the short-side holding portion is less than a thickness of the long-side holding portion.

According to the application example with this configuration, the rigidity of the short-side holding portion can be lower than the rigidity of the long-side holding portion. For example, a manufacturing process can be further simplified than when the short-side holding portion is formed of a material with lower rigidity than the long-side holding portion to fabricate the wavelength variable interference filter having the property that the rigidity of the short-side holding portion is lower than the rigidity of the long-side holding portion.

In the wavelength variable interference filter according to the application example, it is preferable that a length of the short-side holding portion in a direction along the long side of the movable portion is greater than a length of the long-side holding portion in a direction along the short side of the movable portion (i.e., the short side holding portion is wider than the long side holding portion).

According to the application example with this configuration, the rigidity of the short-side holding portion can be lower than the rigidity of the long-side holding portion.

For example, when the second substrate is etched to form the holding portion, a mask pattern may be formed in a shape appropriate for the long-side holding portion and the short-side holding portion. Therefore, it is possible to avoid an increase in the manufacturing process.

In the wavelength variable interference filter according to the application example, it is preferable that a plurality of holes are formed in the holding portion, and an opening area of the holes per unit area in the short-side holding portion is greater than an opening area of the holes in the long-side holding portion.

According to the application example with this configuration, the rigidity of the short-side holding portion can be lower than the rigidity of the long-side holding portion.

A wavelength variable interference filter according to an application example of the invention includes: a first substrate on which a first reflection film is formed; and a second substrate that includes a movable portion on which a second reflection film facing the first reflection film is formed and a holding portion surrounding an outer circumference of the movable portion and holding the movable portion so that the movable portion is displaceable in a thickness direction of the second reflection film. The movable portion has a first side in a first direction and a second side in a second direction intersecting the first direction in a plan view. The holding portion includes a first holding portion formed along the first side, a second holding portion formed along the second side, a corner holding portion surrounded by a pair of lines formed in the first direction in contact with a circumference of the first holding portion close to the movable portion and an outer circumference opposite to the circumference of the first holding portion and a pair of lines formed along the second direction in contact with a circumference of the second holding portion close to the movable portion and an outer circumference opposite to the circumference of the second holding portion, and a protruding holding portion protruding from a part of an outer circumference of the corner holding portion in plan view.

According to this application example, when the movable portion is displaced, the protruding holding portion is bent and a force by which the corner holding portion draws the movable portion is thus relatively weak. Thus, the movable portion is rarely bent. Accordingly, it is possible to also suppress bending of the second reflection film formed on the movable portion, it is possible to suppress a variation in the output wavelength in a plane, and thus it is possible to realize the wavelength variable interference filter with high precision.

In the wavelength variable interference filter according to the application example, it is preferable that the protruding holding portion is continuous with at least one of a part of the first holding portion and a part of the second holding portion and protrudes in a direction away from the movable portion.

According to the application example with this configuration, when the movable portion is displaced, the protruding holding portion is bent and a force by which at least one of the part of the first holding portion and the part of the second holding portion draws the movable portion is thus relatively weak. Therefore, since a force by which a corner portion of the movable portion is drawn by the holding portion can be weakened, the movable portion is further rarely bent.

According to the application example of the invention, the protruding holding portion protrudes in a direction away from the movable portion from the outer circumference of the corner holding portion. Therefore, for example, as in the case in which the protruding holding portion protrudes in a direction approaching the movable portion from the outer circumferences of the corner holding portion, it is not necessary to form the corner portion of the movable portion in a shape appropriate to the protruding holding portion. Accordingly, on this account, it is not necessary to enlarge the movable portion with respect to the rectangular reflection film more than necessary.

An optical module according to an application example of the invention includes: the wavelength variable interference filter described above; and a light receiving unit that receives light transmitted through the wavelength variable interference filter.

According to this application example, it is possible to exit light with a desired target wavelength from the wavelength variable interference filter with high spectroscopic precision. Thus, by allowing the light receiving unit to receive the light, it is possible to accurately measure light intensity of the light with the target wavelength included in incident light.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

Hereinafter, a wavelength variable interference filter according to a first embodiment of the invention will be described.

Configuration of Wavelength Variable Interference Filter

Figure 1:
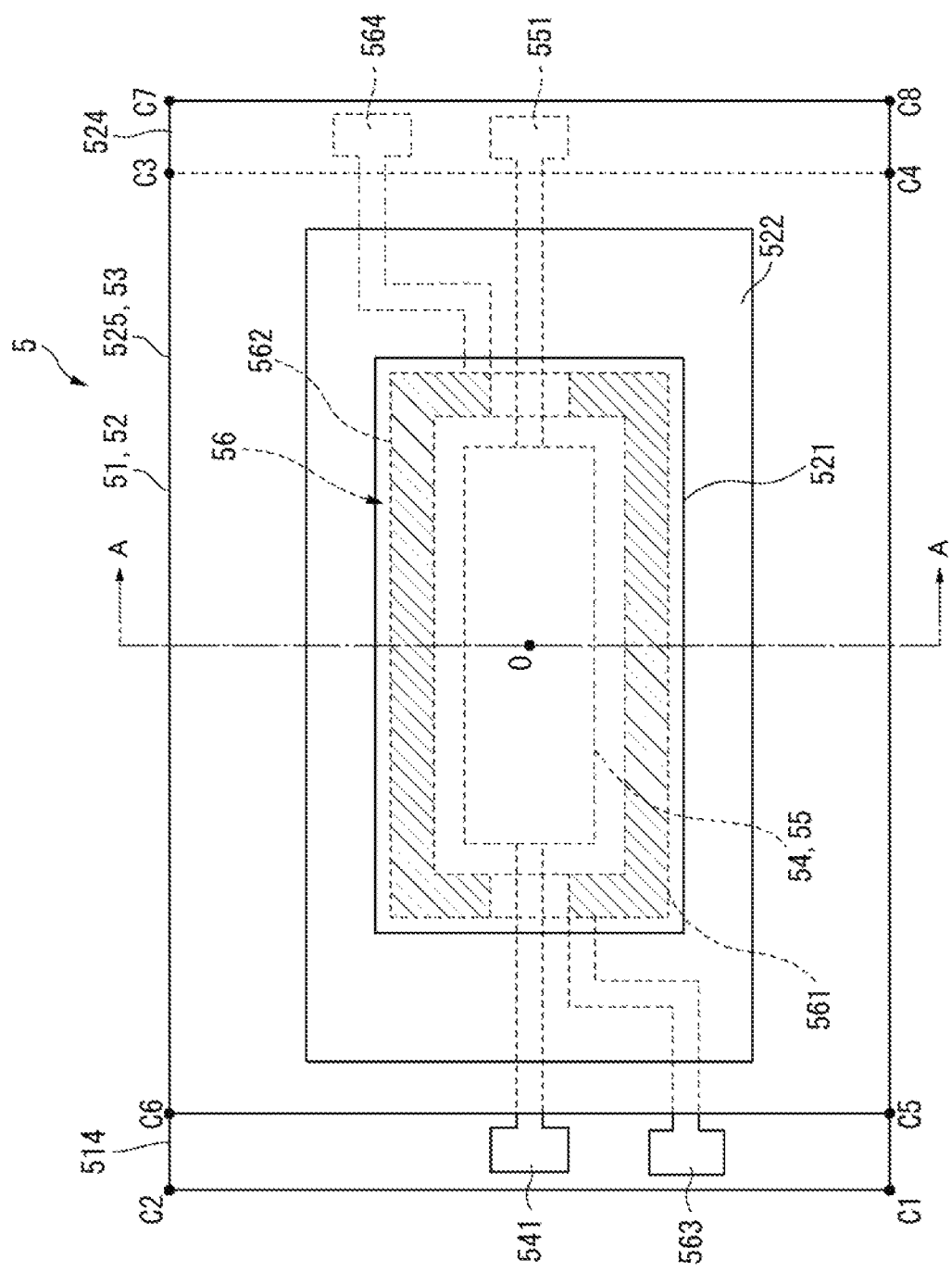
FIG. 1 is a plan view illustrating a schematic configuration of a wavelength variable interference filter according to a first embodiment of the invention.

FIG. 1 is a plan view illustrating a schematic configuration of a wavelength variable interference filter 5 according to a first embodiment.

Figure 2:
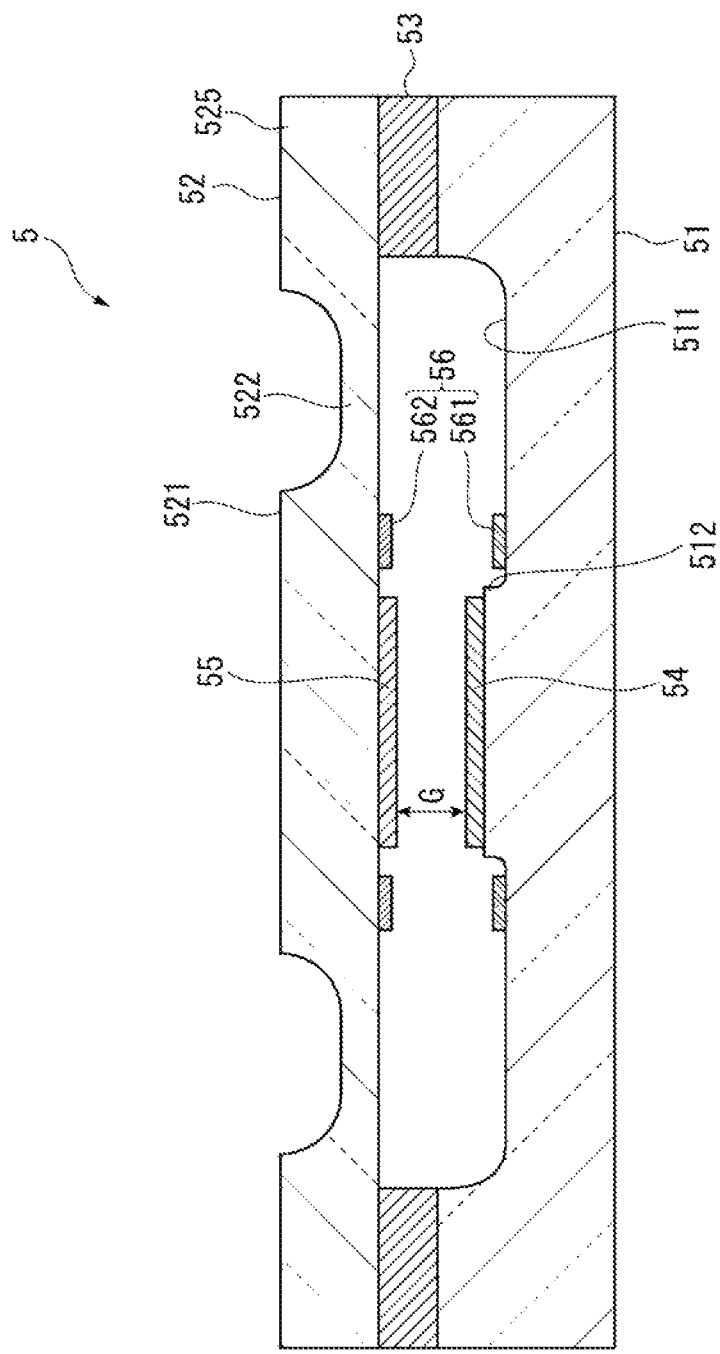
FIG. 2 is a sectional view illustrating the wavelength variable interference filter taken along the line A-A in FIG. 1.

FIG. 2 is a sectional view illustrating the wavelength variable interference filter 5 taken along the line A-A in FIG. 1.

As illustrated in FIGS. 1 and 2, the wavelength variable interference filter 5 includes a translucent fixed substrate 51 and a movable substrate 52. The fixed substrate 51 and the movable substrate 52 are formed of, for example, quartz crystal or any of various kinds of glass such as soda glass, crystalline glass, quartz glass, lead glass, potassium glass, borosilicate glass, non-alkali glass. The fixed substrate 51 and the movable substrate 52 are bound together by a bonding film 53 formed of a plasma polymerized film that has, for example, siloxane as a main component.

A fixed reflection film 54 (a first reflection film) is formed on a counter face of the fixed substrate 51 facing the movable substrate 52. A movable reflection film 55 (a second reflection film) is formed on a counter face of the movable substrate 52 facing the fixed substrate 51. The fixed reflection film 54 and the movable reflection film 55 are disposed to face each other across a gap G (air-gap G).

An electrostatic actuator 56 is used to adjust (change) the dimension (gap dimension) of the gap G is formed in the wavelength variable interference filter 5. The electrostatic actuator 56 includes a fixed electrode 561 formed on the fixed substrate 51 and a movable electrode 562 formed on the movable substrate 52.

In the following description, a plan view in a substrate thickness direction of the fixed substrate 51 or the movable substrate 52, that is, a plan view when the wavelength variable interference filter 5 is viewed in a film thickness direction of the fixed reflection film 54 or the movable reflection film 55, is referred to as a filter plan view. In the embodiment, in the filter plan view, a central point of the fixed reflection film 54 and a central point of the movable reflection film 55 match each other (are coaxial) and the central points of the reflection films 54 and 55 in the plan view are indicated by O.

Configuration of Fixed Substrate 51

The fixed substrate 51 (a first substrate) includes an electrode-disposed groove 511 and a reflection-film-disposed portion (pedestal) 512 formed by, for example, etching, as illustrated in FIG. 2. One end side (a side C1-C2 in FIG. 1) of the fixed substrate 51 protrudes outwards from a substrate edge (a side C5-C6 in FIG. 1) of the movable substrate 52 and configures a first terminal extraction portion 514.

The electrode-disposed groove 511 is formed in a rectangular annular shape centering on the filter central point O of the fixed substrate 51 in the filter plan view. The reflection-film-disposed portion 512 is formed to protrude from a bottom of the electrode-disposed groove 511 to the side of the movable substrate 52 in the filter sectional view. The fixed electrode 561 of the electrostatic actuator 56 is formed on a groove bottom surface of the electrode-disposed groove 511. The fixed reflection film 54 is formed on a protruding front-edge surface of the reflection-film-disposed portion 512.

An electrode extraction groove (not illustrated) extending toward the outer circumference of the fixed substrate 51 from the electrode-disposed groove 511 is formed in the fixed substrate 51.

The fixed electrode 561 is formed in, for example, a rectangular annular shape. As illustrated in FIG. 1, an opening is formed in a part close to the side C1-C2. An insulation film for ensuring insulation with the movable electrode 562 may be configured to be stacked on the fixed electrode 561.

The fixed electrode 561 includes a fixed lead electrode 563 that extends along the electrode extraction groove up to the first terminal extraction portion 514.

As illustrated in FIG. 2, the reflection-film-disposed portion 512 protrudes toward the movable substrate 52 from the central portion of the electrode-disposed groove 511.

The fixed reflection film 54 that is formed in a rectangular shape in the filter plan view is formed on the protruding front-end surface of the reflection-film-disposed portion 512.

The fixed reflection film 54 is configured with a dielectric multilayer in which high refractive layers (for example, Si) and low refractive layers (for example, $SiO_2$) are alternately stacked. An optical film that has desired reflection characteristics can be formed by controlling layer thickness dimensions of each high refractive layer and each low refractive layer.

A conductive film formed of, for example, an electrode material such as ITO is stacked on the surface of the fixed reflection film 54 on the side of the movable substrate 52.

As the fixed reflection film 54, for example, a reflection film such as an Ag alloy that has high reflectance characteristics with respect to a wide wavelength region may be used.

As illustrated in FIG. 1, a first detection electrode 541 that is connected to the outer circumference of the fixed reflection film 54 (conductive film) and extends toward the first terminal extraction portion 514 through an opening of the fixed electrode 561 is formed on the fixed substrate 51. The first detection electrode 541 is formed simultaneously at the time of forming the fixed reflection film 54. The first detection electrode 541 may be formed of a different material from the fixed reflection film 54, for example, gold, etc. that is further appropriate for wiring connection with an external device.

Configuration of Movable Substrate 52 (a Second Substrate)

When an electrostatic attraction is applied by the electrostatic actuator 56, apart (movable portion 521) of the movable substrate 52 is displaced toward the fixed substrate 51 so that a gap dimension between the fixed reflection film 54 and the movable reflection film 55 is changed.

The movable substrate 52 includes a rectangular movable portion 521 (a movable platform) centering on the filter central point O in the filter plan view, as illustrated in FIG. 1, a holding portion 522 (a flexure) having the same axis of the movable portion 521 (the filter central point O and gravitational central point of the holding portion are aligned in a plan view), and a substrate outer circumference portion 525 (a rectangular frame) formed outside of the holding portion 522.

In the movable substrate 52, as illustrated in FIG. 1, one end side (a side C7-C8 in FIG. 1) protrudes outwards from a substrate edge (a side C3-C4 in FIG. 1) of the fixed substrate 51 and configures the second terminal extraction portion 524.

In the filter plan view, the movable portion 521 is formed with a diameter greater than at least a diameter of the outer circumference of the reflection-film-disposed portion 512.

Figure 3:
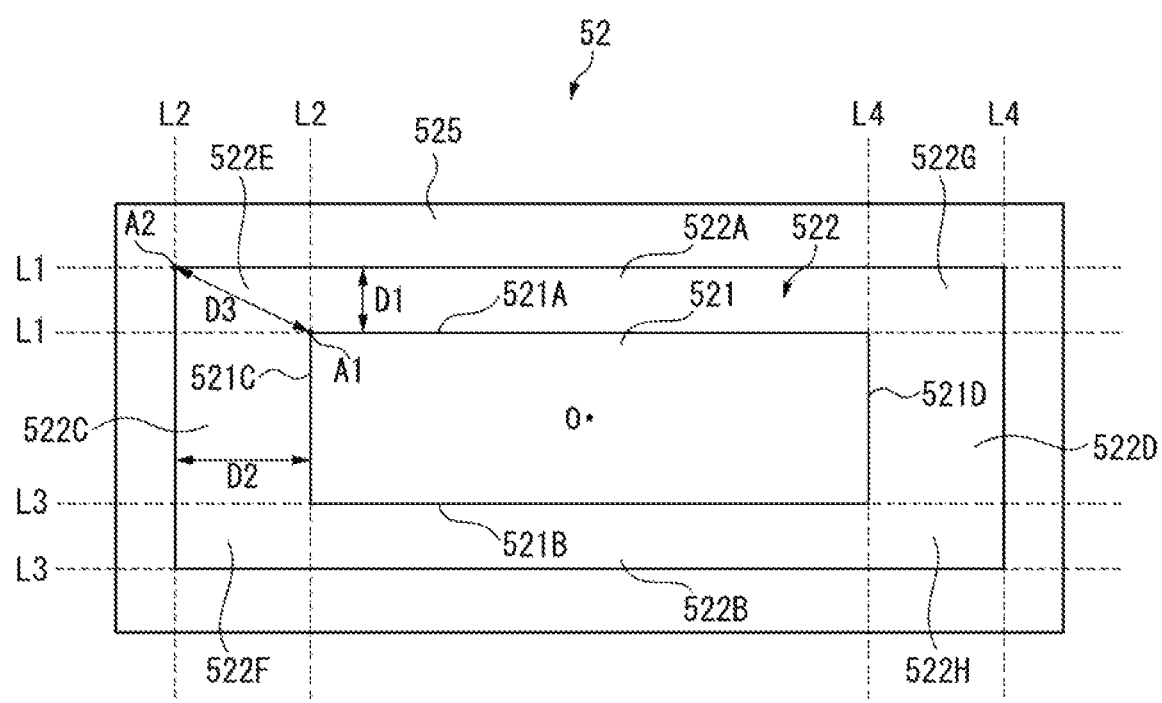
FIG. 3 is a plan view illustrating a movable substrate according to the first embodiment.

FIG. 3 is a plan view illustrating the movable substrate 52. As illustrated in FIG. 3, the movable portion 521 is formed in a rectangular shape in the filter plan view. That is, the movable portion 521 has long sides 521A and 521B which are a pair of first sides, and short sides 521C and 521D which are a pair of second sides.

As illustrated in FIGS. 1 and 2, the movable reflection film 55 and the movable electrode 562 are formed on the movable portion 521.

In the filter plan view, the movable electrode 562 is formed outboard of the outer circumference of the movable reflection film 55 and is disposed to face the fixed electrode 561 via a gap. The movable electrode 562 is formed in a rectangular annular shape. As illustrated in FIG. 1, an opening is formed in a part close to the side C7-C8. As in the fixed electrode 561, an insulation film may be stacked on the movable electrode 562.

Here, as illustrated in FIG. 1, in the filter plan view, the electrostatic actuator 56 is formed in a region in which the movable electrode 562 and the fixed electrode 561 overlap each other (a region by right and upward diagonal lines in FIG. 1). As illustrated in FIG. 1, the electrostatic actuator 56 is disposed to have a shape point-symmetric with respect to the filter central point O in the filter plan view. Accordingly, an electrostatic attraction generated at the time of applying a voltage to the electrostatic actuator 56 is also applied to the position point-symmetric with respect to the filter central point O, and thus the movable portion 521 can be displaced toward the fixed substrate 51 with good balance.

As illustrated in FIG. 1, in the movable electrode 562, a movable lead electrode 564 extending toward a second terminal extraction portion 524 is formed. The movable lead electrode 564 is disposed at a position facing the electrode extraction groove formed in the fixed substrate 51.

The movable reflection film 55 has a rectangular shape in the filter plan view, is formed in a central portion of the surface of the movable portion 521 facing the fixed substrate 51, and faces the fixed reflection film 54 across the gap G. As the movable reflection film 55, a dielectric multiplayer in which a high refractive layer (for example, Si) and a low refractive layer (for example, $SiO_2$) are stacked can be used.

A conductive film formed of, for example, an electrode material such as ITO is installed on the surface of the movable reflection film 55, as in the fixed reflection film 54.

As the movable reflection film 55, for example, a reflection film such as an Ag alloy that has high reflectance characteristics with respect to a wide wavelength region may be used as in the fixed reflection film 54.

In the movable substrate 52, as illustrated in FIG. 1, a second detection electrode 551 that is connected to the outer circumference of the movable reflection film 55 (conductive film) and extends toward the second terminal extraction portion 524 through an opening of the movable electrode 562 is formed.

In the embodiment, as illustrated in FIG. 2, an example in which a gap between the electrodes 561 and 562 is greater than the gap G is indicated, but the invention is not limited thereto. For example, when infrared light is used as measurement target light, the gap G may be greater than the gap between the electrodes 561 and 562 depending on a measurement target wavelength band.

The holding portion 522 is a diaphragm (monolithic flexure) surrounding the circumference of the movable portion 521 and is formed with a thickness dimension less than the movable portion 521. The holding portion 522 is more easily bent than the movable portion 521 and can displace the movable portion 521 toward the fixed substrate 51 by a slight electrostatic attraction. Since the movable portion 521 has the greater thickness and rigidity than those of the holding portion 522, a change in the shape of the movable portion 521 is suppressed even when the holding portion 522 is drawn to the side of the fixed substrate 51 by the electrostatic attraction.

The holding portion 522 is formed by etching the movable substrate 52. In the embodiment, since isotropic etching is used, the internal surface of the groove formed to the movable substrate 52 can be formed as a curved surface by the etching. Thus, it is possible to suppress the concentration of stress on a part of the internal surface of the groove. In the embodiment, the movable substrate 52 is etched from the opposite side to the fixed substrate 51, but the invention is not limited thereto. That is, the etching may be performed on the movable substrate 52 from the side of the fixed substrate 51 or both the side of the fixed substrate 51 and the opposite side to the fixed substrate 51.

Next, the shape of the holding portion 522 will be described in detail. As illustrated in FIG. 3, the holding portion 522 includes a long-side (longitudinal) holding portion 522A which is a first holding portion formed along a long side 521A of the movable portion 521, a long-side holding portion 522B which is a first holding portion formed along a long side 521B of the movable portion 521, a short-side (transverse) holding portion 522C which is a second holding portion formed along a short side 521C of the movable portion 521, and a short-side holding portion 522D which is a second holding portion formed along a short side 521D of the movable portion 521.

The long-side holding portions 522A and 522B are formed in a rectangular shape in the filter plan view. The edge frames in a direction along the long sides 521A and 521B (also referred to as a long-side (longitudinal) direction or a first direction) are located on the same straight line as the short sides 521C and 521D.

The short-side holding portions 522C and 522D are formed in a rectangular shape in the filter plan view. The edge frames in a direction along the short sides 521C and 521D (also referred to as a short-side (transverse) direction or a second direction) are located on the same straight line as the long sides 521A and 521B.

Further, the holding portion 522 includes a corner holding portion 522E surrounded by a pair of lines L1 formed in the long-side direction in contact with the outer circumference of the long-side holding portion 522A and a pair of lines L2 formed in the short-side direction in contact with the outer circumference of the short-side holding portion 522C in the filter plan view. One of the corner holding portions continues to one of the short-side holding portions and one of the long-side holding portions at the dotted lines in FIG. 3. Further, the holding portion 522 includes a corner holding portion 522F surrounded by the lines L2 and a pair of lines L3 formed in the long-side direction in contact with the outer circumference of the long-side holding portion 522B, a corner holding portion 522G surrounded by the lines L1 and a pair of lines L4 formed in the short-side direction in contact with the outer circumference of the short-side holding portion 522D, and a corner holing portion 522H surrounded by the lines L3 and the lines L4.

In the embodiment, a dimension D2 in the long-side direction in the short-side holding portions 522C and 522D is longer than a dimension D1 in the short-side direction in the long-side holding portions 522A and 522B. Therefore, the short-side holding portions 522C and 522D have lower rigidity than the long-side holding portions 522A and 522B.

In the filter plan view, a distance D3 between a vertex A1 which is the closest to the filter central point O and a vertex A2 which is the farthest from the filter central point O in the corner holding portions 522E and 522H is longer than the dimensions D1 and D2. Therefore, the corner holding portions 522E and 522H have lower rigidity than the long-side holding portions 522A and 522B and the short-side holding portions 522C and 522D.

The substrate outer circumference portion 525 is formed circumferentially outside of the holding portion 522 in the filter plan view. The surface of the substrate outer circumference portion 525 facing the fixed substrate 51 is bonded to the fixed substrate 51 via the bonding film 53.

In the foregoing wavelength variable interference filter 5, the gap dimension of a space (the gap G) between the fixed reflection film 54 and the movable reflection film 55 can be changed by applying a driving voltage from the fixed lead electrode 563 and the movable lead electrode 564 to the fixed electrode 561 and the movable electrode 562 included in the electrostatic actuator 56. By a applying a high-frequency voltage between the fixed reflection film 54 (conductive film) and the movable reflection film 55 (conductive film) via the first detection electrode 541 and the second detection electrode 551, it is possible to convert electrostatic capacitance between the reflection films 54 and 55 into a voltage value for measurement. By performing feedback control on the driving voltage applied to the electrostatic actuator 56 based on the measured electrostatic capacitance, it is possible to control the gap dimension of the gap G with high precision.

Operational Effects of First Embodiment

In the embodiment, the rigidity of the short-side holding portions 522C and 522D is lower than the rigidity of the long-side holding portions 522A and 522B. In this configuration, compared to a case in which the rigidity of the short-side holding portions 522C and 522D is the same as the rigidity of the long-side holding portions 522A and 522B, the short-side holding portions 522C and 522D are more easily bent when the movable portion 521 is displaced. Thus, a force by which the short-side holding portions 522C and 522D draw the movable portion 521 is relatively weak. Therefore, it is possible to reduce the bending amount of the movable portion 521 in the long-side direction. Accordingly, it is possible to also suppress the bending of the movable reflection film 55 formed on the movable portion 521, it is possible to suppress a variation in an output wavelength in the plane, and thus it is possible to realize the wavelength variable interference filter 5 with high precision.

In the embodiment, the rigidity of the corner holding portions 522E and 522H is lower than the rigidity of the long-side holding portions 522A and 522B and the short-side holding portions 522C and 522D. In this configuration, compared to a case in which the rigidity of the corner holding portions 522E to 522H is the same as the rigidity of the long-side holding portions 522A and 522B or the short-side holding portions 522C and 522D, the corner holding portions 522E to 522H are more easily bent when the movable portion 521 is displaced. Thus, a force by which the corner holding portions 522E to 522H draw the movable portion 521 is relatively weak. Therefore, the movable portion 521 is rarely bent.

In the embodiment, the rigidity of the short-side holding portions 522C and 522D is set to be lower than the rigidity of the long-side holding portions 522A and 522B by causing the dimension D2 of the short-side holding portions 522C and 522D to be longer than the dimension D1 of the long-side holding portions 522A and 522B. In this configuration, for example, comparing to the case that the short-side holding portions 522C and 522D are formed of a material with lower rigidity than the long-side holding portions 522A and 522B, a manufacturing process can be further simplified. When the movable substrate 52 is etched to form the holding portions 522, the long-side holding portions 522A and 522B and the short-side holding portions 522C and 522D can be formed merely by forming a mask pattern in a shape appropriate to the long-side holding portions 522A and 522B and the short-side holding portions 522C and 522D. Therefore, it is possible to avoid an increase in the manufacturing process.

Second Embodiment

A wavelength variable interference filter according to a second embodiment is different from the wavelength variable interference filter 5 according to the first embodiment in a planar shape of the long-side holding portions 522A and 522B in the movable substrate. The remaining configuration is the same as the wavelength variable interference filter according to the first embodiment.

Figure 4:
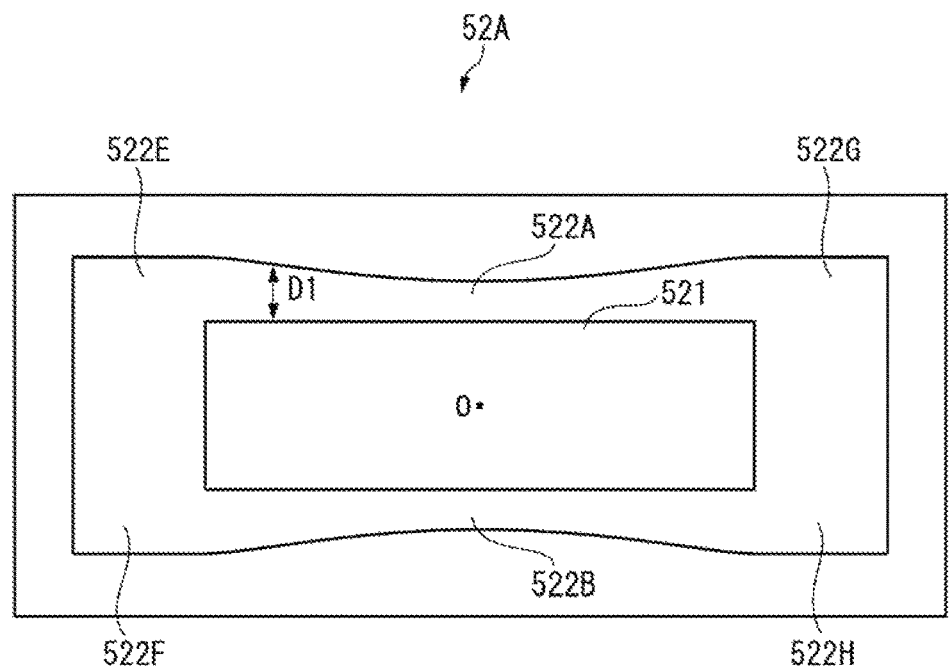
FIG. 4 is a plan view illustrating a movable substrate according to a second embodiment of the invention.

FIG. 4 is a plan view illustrating a movable substrate 52A according to the second embodiment. The same reference numerals are given to the same elements as that of the movable substrate 52 according to the first embodiment.

As illustrated in FIG. 4, an outer circumference (circumferential wall) of the long-side holding portions 522A and 522B of the movable substrate 52A, in contact with the substrate outer circumference portion 525 is hollowed to be curved toward the movable portion 521 in the filter plan view.

That is, in the long-side holding portion 522A, the dimension D1 is gradually shortened from both ends in contact with the corner holding portions 522E and 522G toward the center thereof. In the long-side holding portion 522B, the dimension D1 is gradually shortened from both ends in contact with the corner holding portions 522F and 522H toward the center thereof.

In this configuration, the rigidity of the long-side holding portions 522A and 522B is progressively lowered in the filter plan view as a distance from the center of the movable portion 521, that is, the filter central point O, increases. The rigidity of the long-side holding portion is progressively lowered in the direction in the long side as a distance from a normal of the long side passing through the center of the movable portion increases.

Operational Effects of Second Embodiment

In the embodiment, the rigidity of the long-side holding portions 522A and 522B is progressively lowered in the long-side direction as the distance from the filter central point O increases. In this configuration, when the movable portion 521 is displaced, the long-side holding portions 522A and 522B are easily bent at a position father from the center. Thus, a force drawing the movable portion 521 is relatively weak. Accordingly, it is possible to cause a displacement amount of the movable portion 521 to be constant in the long-side direction, and thus it is possible to reduce the bending of the movable portion 521 in the long-side direction.

Because of the same formations as those according to the first embodiment, it is possible to obtain the same operational effects.

Third Embodiment

A wavelength variable interference filter according to a third embodiment is different from the wavelength variable interference filter according to the second embodiment in a planar shape of the short-side holding portions 522C and 522D in the movable substrate. The remaining configuration is the same as the wavelength variable interference filter according to the second embodiment.

Figure 5:
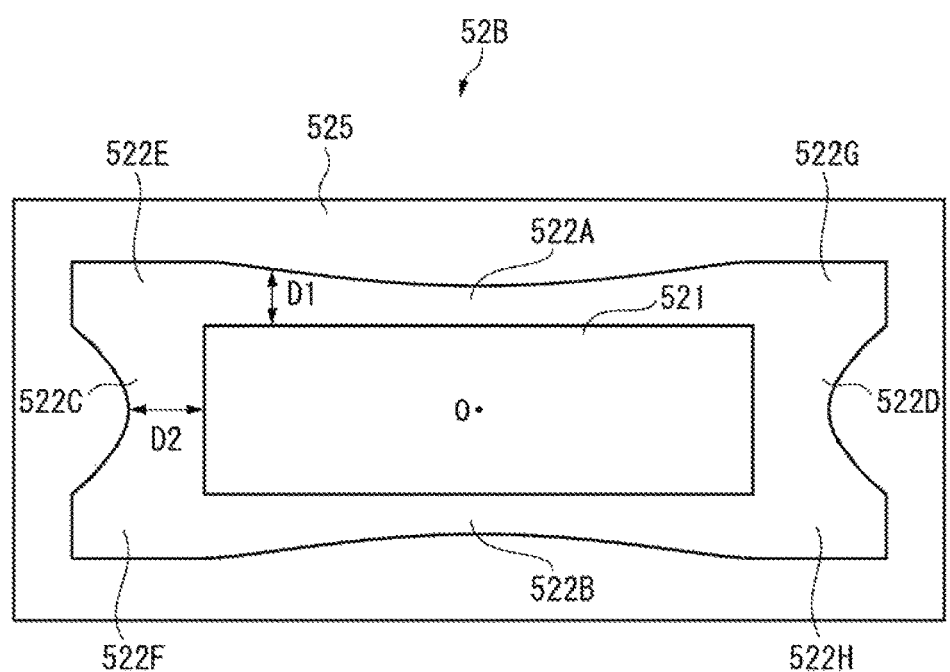
FIG. 5 is a plan view illustrating a movable substrate according to a third embodiment of the invention.

FIG. 5 is a plan view illustrating a movable substrate 52B according to the third embodiment of the invention. The same reference numerals are given to the same elements as that of the movable substrate 52 according to the first and second embodiment.

As illustrated in FIG. 5, an outer circumference (circumferential wall) of the short-side holding portions 522C and 522D of the movable substrate 52B, in contact with the substrate outer circumference portion 525 is hollowed to be curved toward the movable portion 521 in the filter plan view.

That is, in the short-side holding portion 522C, the dimension D2 is gradually shortened from both ends in contact with the corner holding portions 522E and 522F toward the center thereof in the short-side direction. In the short-side holding portion 522D, the dimension D2 is gradually shortened from both ends in contact with the corner holding portions 522G and 522H toward the center thereof in the short-side direction.

In this configuration, the rigidity of the short-side holding portions 522C and 522D is progressively lowered in the filter plan view as a distance from the center of the movable portion 521, that is, the filter central point O, increases. The rigidity of the short-side holding portion is progressively lowered in the direction along the short side as a distance from a normal of the short side passing through the center of the movable portion increases.

The dimension D1 of the long-side holding portions 522A and 522B may be uniform. As in the second embodiment, however, the dimension D1 may be gradually shortened from both ends to the center thereof in the long-side direction.

Operational Effects of Third Embodiment

In the embodiment, the rigidity of the short-side holding portions 522C and 522D is progressively lowered in the short-side direction as the distance from the filter central point O increases. In this configuration, when the movable portion 521 is displaced, the short-side holding portions 522C and 522D are easily bent at a position farther from the center in the short-side direction. Thus, a force drawing the movable portion 521 is relatively weak. Accordingly, it is possible to cause a displacement amount of the movable portion 521 to be constant in the short-side direction, and it is possible to reduce the bending of the movable portion 521 in the short-side direction.

Because of the same formations as those according to the first and second embodiments, it is possible to obtain the same operational effects.

Fourth Embodiment

A wavelength variable interference filter according to a fourth embodiment is different from the wavelength variable interference filter according to the first to third embodiments in that a holding portion in the movable substrate includes a protruding holding portion that protrudes from an outer circumference of corner holding portions 522E to 522H. The remaining configuration is the same as the wavelength variable interference filter according to the first to third embodiments.

Figure 6:
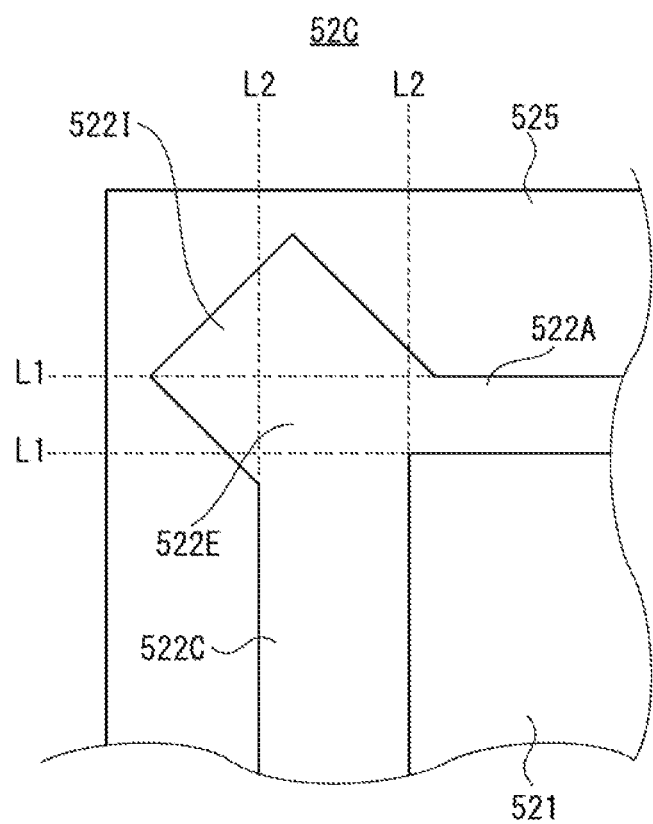
FIG. 6 is a plan view illustrating a movable substrate according to a fourth embodiment of the invention.

A holding portion of the movable substrate 52C according to the fourth embodiment includes a protruding holding portion 522I protruding in a direction away from the movable portion 521 from an outer circumference of the corner holding portion 522E, an outer circumference of a part of the short-side holding portion 522C continuing with the corner holding portion 522E, and an outer circumference of a part of the long-side holding portion 522A continuing with the corner holding portion 522E in the filter plan view, as illustrated in FIG. 6 (a rectangular shaped, obliquely angled, relief). The protruding holding portion 522I protrudes in a direction from the filter central point O to the corner holding portion 522E.

The protruding holding portion 522I may protrude from one outer circumference of the outer circumference of the corner holding portion 522E, the outer circumference of a part of the long-side holding portion 522A continuing with the corner holding portion 522E, and the outer circumference of a part of the short-side holding portion 522C continuing with the corner holding portion 522E.

Although not illustrated, the holding portion of the movable substrate 52C includes the protruding holding portion 522I that similarly protrudes from the corner holding portions 522F to 522H.

Operational Effects of Fourth Embodiment

According to the embodiment, the holding portion includes the protruding holding portion 522I. In this configuration, when the movable portion 521 is displaced, the protruding holding portion 522I is bent and a force by which the corner holding portions 522F to 522H draw the movable portion 521 is relatively weak. Thus, the movable portion 521 is rarely bent. Accordingly, it is possible to suppress a variation in the output wavelength in a plane.

The protruding holding portion 522I is continuous with at least one of a part of the long-side holding portions 522A and 522B and the short-side holding portions 522C and 522D. Therefore, when the movable portion 521 is displaced, the protruding holding portion 522I is bent and a force by which at least the one part draws the movable portion 521 is relatively weak. Therefore, compared to a case in which the protruding holding portion 522I does not continue with the one part, a force by which a corner portion of the movable portion 521 is drawn by the holding portion can be weakened. Thus, the movable portion 521 is further rarely bent.

The protruding holding portion 522I protrudes in a direction away from the movable portion 521 from the outer circumferences of the corner holding portions 522F to 522H. Therefore, for example, as in the case in which the protruding holding portion protrudes in a direction approaching the movable portion 521 from the outer circumferences of the corner holding portions 522F to 522H, it is not necessary to form a corner portion of the movable portion 521 in a shape appropriate to the protruding holding portion. Accordingly, it is not necessary to overly enlarge the movable portion with respect to the rectangular reflection film.

In addition, it is possible to obtain the same operational effects as those of the first to third embodiments.

Fifth Embodiment

A wavelength variable interference filter according to a fifth embodiment is different from the wavelength variable interference filter according to the fourth embodiment in that the position and the shape of a protruding holding portion are different. The remaining configuration is the same as the wavelength variable interference filter according to the fourth embodiment.

Figure 7:
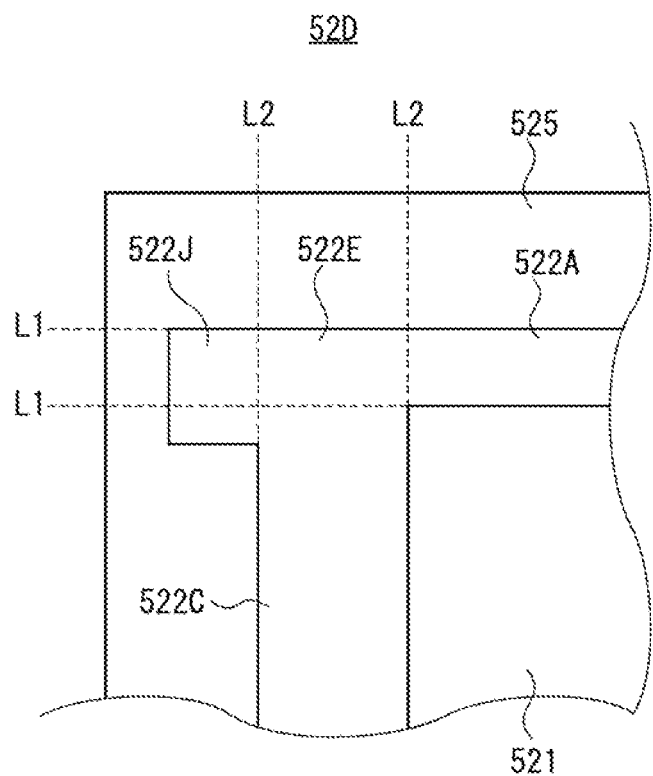
FIG. 7 is a plan view illustrating a movable substrate according to a fifth embodiment of the invention.

A holding portion of the movable substrate 52D according to the fifth embodiment includes a protruding holding portion 522J that protrudes in the long-side direction from the outer circumference the corner holding portion 522E and the outer circumference of a part of the short-side holding portion 522C continuing with the corner holding portion 522E in the filter plan view, as illustrated in FIG. 7 (a rectangular shaped, longitudinally oriented, relief).

The protruding holding portion 522J may protrude in the short-side direction from the outer circumference of the corner holding portion 522E and the outer circumference of a part of the long-side holding portion 522A continuing with the corner holding portion 522E in the filter plan view. Alternatively, the protruding holding portion 522J may protrude in the long-side direction from the outer circumference of the corner holding portion 522E and the outer circumference of a part of the short-side holding portion 522C continuing with the corner holding portion 522E and may protrude in the short-side direction from the outer circumference of the corner holding portion 522E and the outer circumference of a part of the long-side holding portion 522A continuing with the corner holding portion 522E, simultaneously.

Although not illustrated, the holding portion of the movable substrate 52D includes the protruding holding portion 522J that similarly protrudes from the corner holding portions 522F to 522H.

Operational Effects of Fifth Embodiment

In the embodiment, as in the fourth embodiment, a force by which a corner portion of the movable portion 521 is drawn by the holding portion can also be weakened. Thus, the movable portion 521 is further rarely bent. For example, comparing to the case in which the protruding holding portion protrudes in a direction approaching the movable portion 521 from the outer circumferences of the corner holding portions 522F to 522H, it is not necessary to form a corner portion of the movable portion 521 in a shape appropriate to the protruding holding portion. Accordingly, it is not necessary to overly enlarge the movable portion with respect to the rectangular reflection film.

In addition, it is possible to obtain the same operational effects as those of the first to third embodiments.

Sixth Embodiment

A wavelength variable interference filter according to a sixth embodiment is different from the wavelength variable interference filter according to the fourth and fifth embodiments in that the position and the shape of a protruding holding portion are different. The remaining elements are the same as the wavelength variable interference filter according to the fourth and fifth embodiments.

Figure 8:
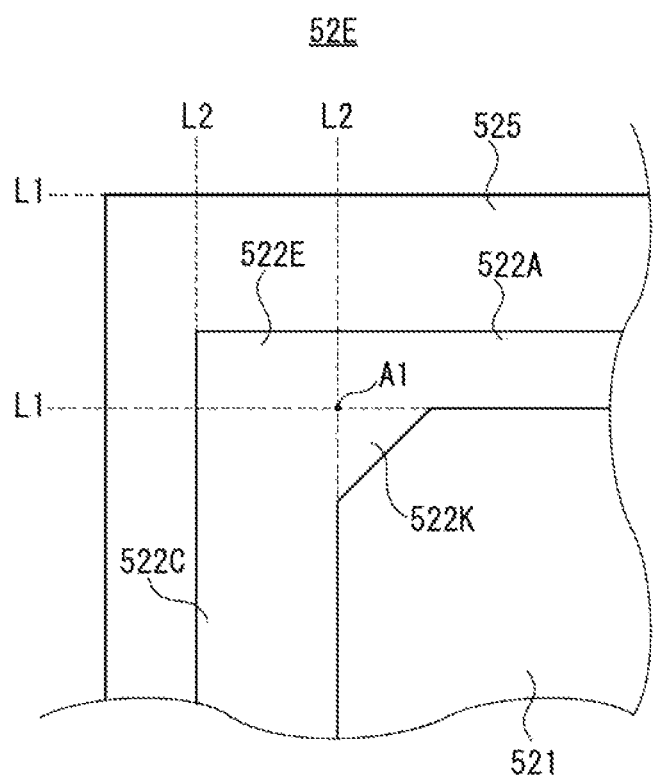
FIG. 8 is a plan view illustrating a movable substrate according to a sixth embodiment of the invention.

The holding portion of the movable substrate 52E according to the sixth embodiment includes a protruding holding portion 522K that protrudes in a direction approaching the movable portion 521 from a vertex A1 closest to the filter center point O in the corner holding portion 522E, the outer circumference of a part of the long-side holding portion 522A continuing with the corner holding portion 522E, and the outer circumference of a part of the short-side holding portion 522C continuing with the corner holding portion 522E in the filter plan view, as illustrated in FIG. 8 (a triangular buttress). The protruding holding portion 522K is a triangular shape in the filter plan view.

Although not illustrated, the holding portion of the movable substrate 52E also includes the protruding holding portion 522K that similarly protrudes from the corner holding portions 522F to 522H.

Operational Effects of Sixth Embodiment

In the embodiment, as in the fourth and fifth embodiments, a force by which a corner portion of the movable portion 521 is drawn by the holding portion can also be weakened. Thus, the movable portion 521 is further rarely bent.

In addition, it is possible to obtain the same operational effects as those of the first to third embodiments.

Seventh Embodiment

Next, a seventh embodiment of the invention will be described.

In the seventh embodiment, an example of a spectroscope in which the wavelength variable interference filter described in the foregoing first to sixth embodiments is incorporated will be described with reference to the drawing. Here, the description will be made assuming that the wavelength variable interference filter 5 according to the first embodiment is incorporated as a representative of the wavelength variable interference filters according to the embodiment.

Configuration of Spectroscope

Figure 9:
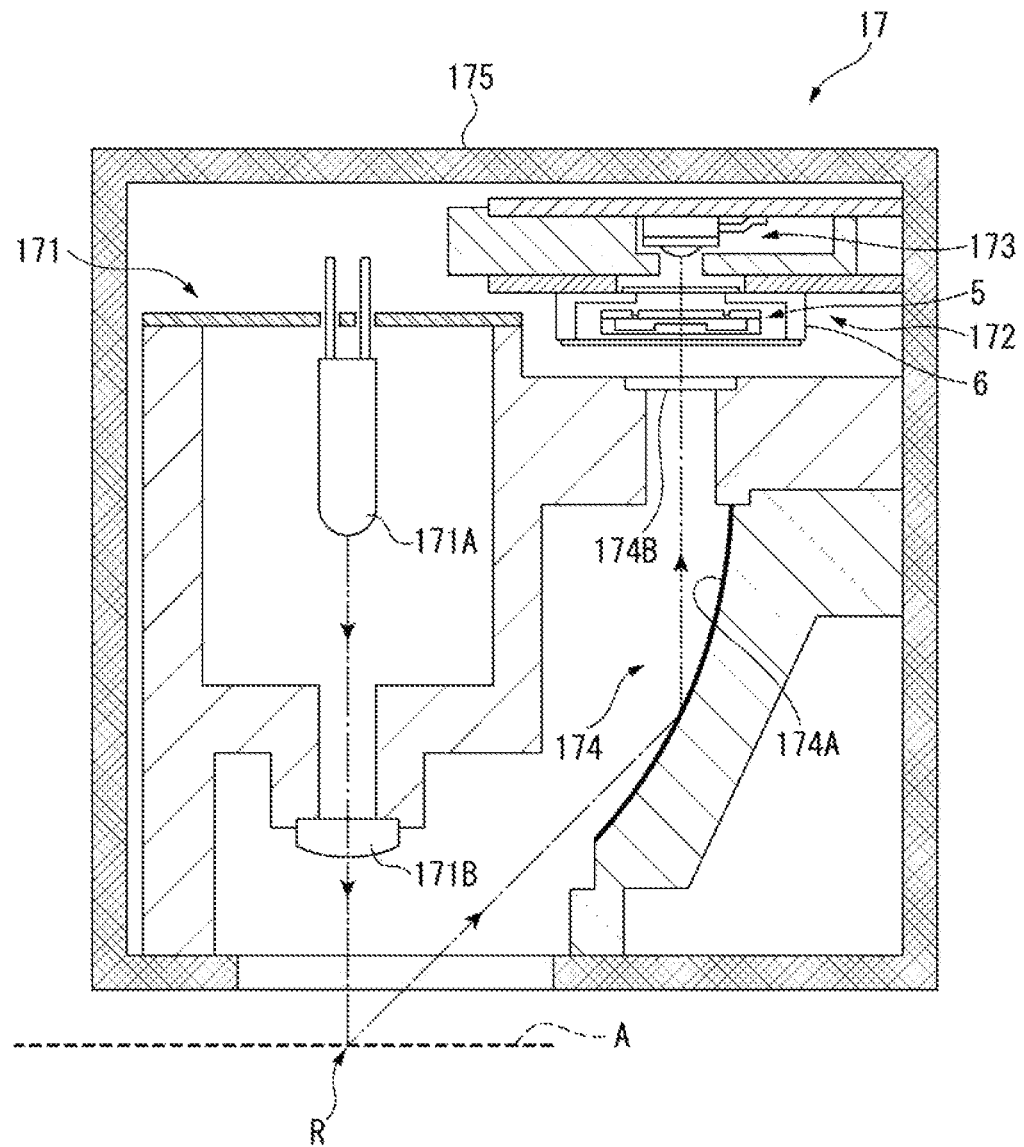
FIG. 9 is a sectional view illustrating a schematic configuration of a spectroscope according to a seventh embodiment of the invention.

FIG. 9 is a sectional view illustrating a schematic configuration of a spectroscope 17.

The spectroscope 17 is an optical module and includes a light source unit 171, an optical filter device 172, a light receiving unit 173, a light guiding unit 174, and a casing 175, as illustrated in FIG. 9.

The spectroscope 17 radiates illumination light from the light source unit 171 to a measurement position R on a measurement target A and causes a light component reflected from the measurement position R to be incident on the optical filter device 172 by the light guiding unit 174. Then, the optical filter device 172 causes light with a predetermined wavelength to exit (transmit) from the reflected light and causes the light receiving unit 173 to receive the light. The optical filter device 172 can select a transmission wavelength under the control of a control unit (not illustrated) and can perform spectrometry of light from the measurement position R on the measurement target A by measuring the amount of the light with each wavelength of the visible light.

Configuration of Light Source Unit

The light source unit 171 includes a light source 171A and a condensing unit 171B. The light source unit 171 radiates light emitted from the light source 171A to the measurement position R of the measurement target A from a normal direction to the surface of the measurement target A.

A light source capable of emitting light with each wavelength in the visible light band is preferable as the light source 171A. For example, a halogen lamp, a xenon lamp, or a white LED can be exemplified as the light source 171A. In particular, a white LED which can be easily installed in a restricted space is preferable. The condensing unit 171B is configured with, for example, a condensing lens and collects light from the light source 171A to the measurement position R. In FIG. 9, only one lens (condensing lens) is displayed in the condensing unit 171B, but a plurality of lenses may be used.

Configuration of Optical Filter Device

The optical filter device 172 includes a casing 6 and the wavelength variable interference filter 5 accommodated in the casing 6. The casing 6 has an accommodation space therein and the wavelength variable interference filter 5 is accommodated in the accommodation space. The casing 6 includes terminal portions connected to the fixed lead electrode 563, the movable lead electrode 564, the first detection electrode 541, and the second detection electrode 551 of the wavelength variable interference filter. The terminal portions are connected to the control unit. Based on an instruction signal from the control unit, a predetermined voltage is applied to the electrostatic actuator 56 of the wavelength variable interference filter 5, and light with a wavelength corresponding to the applied voltage is accordingly emitted from the wavelength variable interference filter 5. Electrostatic capacitance corresponding to the gap dimension between the reflection films 54 and 55 is detected based on signals from the first detection electrode 541 and the second detection electrode 551.

Configurations of Light Receiving Unit and Light Guiding Optical System

As illustrated in FIG. 9, the light receiving unit 173 is disposed on an optical axis of the wavelength variable interference filter 5 and receives light transmitted through the wavelength variable interference filter 5. Then, the light receiving unit 173 outputs a detection signal (current value) corresponding to an amount of received light under the control of the control unit. The detection signal output by the light receiving unit 173 is input to the control unit via an I-V converter (not illustrated), an amplifier (not illustrated), and an AD converter (not illustrated).

The light guiding unit 174 includes a reflection mirror 174A and a bandpass filter 174B.

The light guiding unit 174 reflects light reflected at 45° from the surface of the measurement target A at the measurement position R to the optical axis of the wavelength variable interference filter 5 by the reflection mirror 174A. The bandpass filter 174B cuts ultraviolet light and infrared light, and transmits the light of the visible light band (for example, 380 nm to 720 nm). Thus, light with the visible light band is incident on the wavelength variable interference filter 5 and light with a wavelength selected from the visible light band by the wavelength variable interference filter 5 is received by the light receiving unit 173.

Operational Effects of Seventh Embodiment

The spectroscope 17 according to the embodiment includes the wavelength variable interference filter described in the foregoing first to sixth embodiments and the light receiving unit 173 that receives light transmitted through the wavelength variable interference filter.

Here, the wavelength variable interference filter can reduce a variation of wavelength of transmitted light in the plane when the gap dimension of the gap G is controlled, as described above and thus can transmit light with a desired wavelength with high spectroscopic precision. Accordingly, by allowing the light receiving unit 173 to receive the light, it is possible to perform the spectroscopic measurement on a measurement target with high precision.

Other Embodiments

The invention is not limited to the above-described embodiments and modifications, improvements, and the like within the scope of the invention are included in the invention.

For example, in the foregoing first embodiment, the rigidity of the short-side holding portions 522C and 522D is set to be lower than the rigidity of the long-side holding portions 522A and 522B by causing the dimension D2 of the short-side holding portions 522C and 522D to be longer than the dimension D1 of the long-side holding portions 522A and 522B, but the invention is not limited thereto.

For example, the rigidity of the short-side holding portions 522C and 522D may be set to be lower than the rigidity of the long-side holding portions 522A and 522B by causing the dimension in the thickness direction of the short-side holding portions 522C and 522D to be shorter than the dimension in the thickness direction of the long-side holding portions 522A and 522B.

Figure 10:
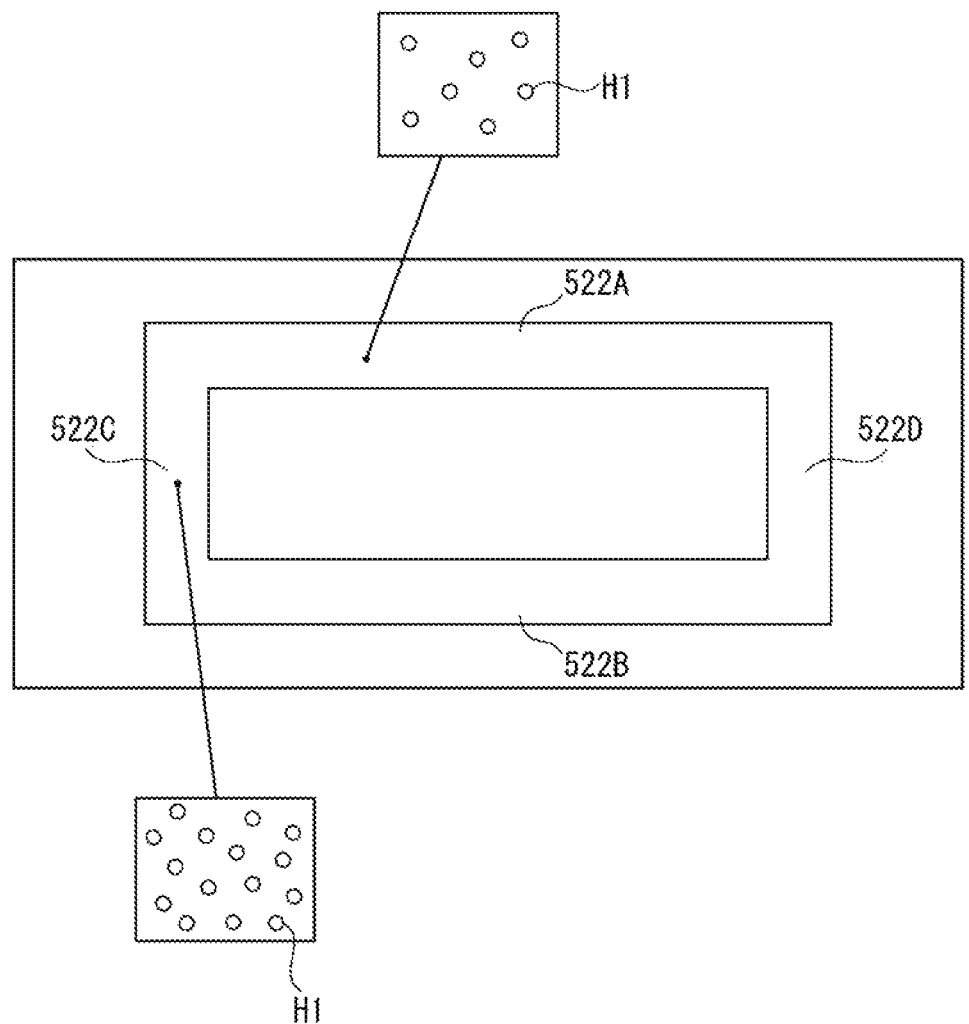
FIG. 10 is a plan view illustrating a movable substrate according to another embodiment of the invention.

By forming holes H1 (perforations) in the long-side holding portions 522A and 522B and the short-side holding portions 522C and 522D, as illustrated in FIG. 10, and causing an opening area of the holes H1 per unit area to be greater in the short-side holding portions 522C and 522D than in the long-side holding portions 522A and 522B, the rigidity of the short-side holding portions 522C and 522D may be set to be lower than the rigidity of the long-side holding portion 522A and 522B. The opening area can be set according to the size of an opening of the hole H1 or the number of holes H1 per unit area.

In the foregoing second and third embodiments, the rigidity of the long-side holding portions 522A and 522B is progressively lowered as the distance from the filter central point O increases by gradually shortening the dimension D1 of the long-side holding portions 522A and 522B from both ends to the center in the long-side direction, but the invention is not limited thereto.

For example, by gradually enlarging the dimension in the thickness direction of the long-side holding portions 522A and 522B from both ends to the center in the long-side direction, the rigidity of the long-side holding portions 522A and 522B may be lowered as the distance from the filter central point O increases.

By forming the holes H1 in the long-side holding portion 522A and 522B and gradually decreasing an opening area of the holes H1 per unit area from both ends to the center in the long-side direction, the rigidity of the long-side holding portions 522A and 522B may be lowered as the distance from the filter central point O increases.

In the foregoing third embodiment, the rigidity of the short-side holding portions 522C and 522D is progressively lowered as the distance from the filter central point O increases by gradually shortening the dimension D2 of the short-side holding portions 522C and 522D from both ends to the center in the short-side direction, but the invention is not limited thereto.

For example, by gradually enlarging the dimension in the thickness direction of the short-side holding portions 522C and 522D from both ends to the center in the short-side direction, the rigidity of the short-side holding portions 522C and 522D may be lowered as the distance from the filter central point O increases.

By forming the holes H1 in the short-side holding portions 522C and 522D and gradually decreasing an opening area of the holes H1 per unit area from both ends to the center in the short-side direction, the rigidity of the short-side holding portions 522C and 522D may be lowered as the distance from the filter central point O increases.

In the wavelength variable interference filter according to the foregoing first to sixth embodiments, the holding portion includes corner portions in the filter plan view, but the corner portions may be round.

Figure 11:
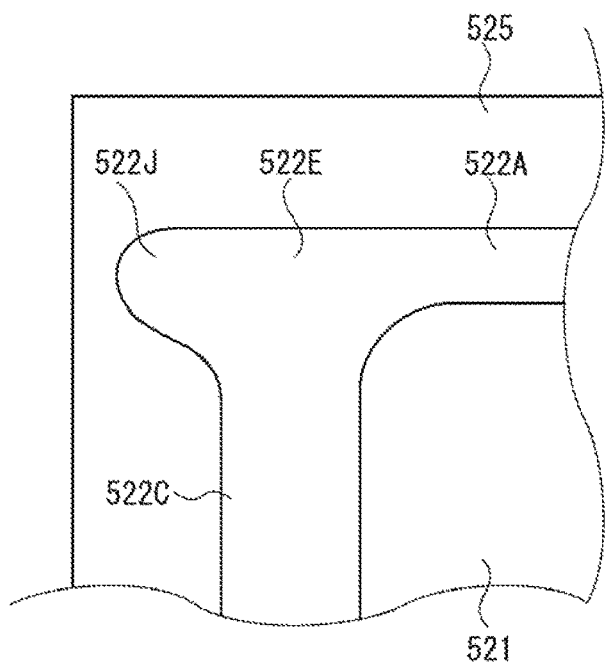
FIG. 11 is a plan view illustrating a movable substrate according to still another embodiment of the invention.
Figure 12:
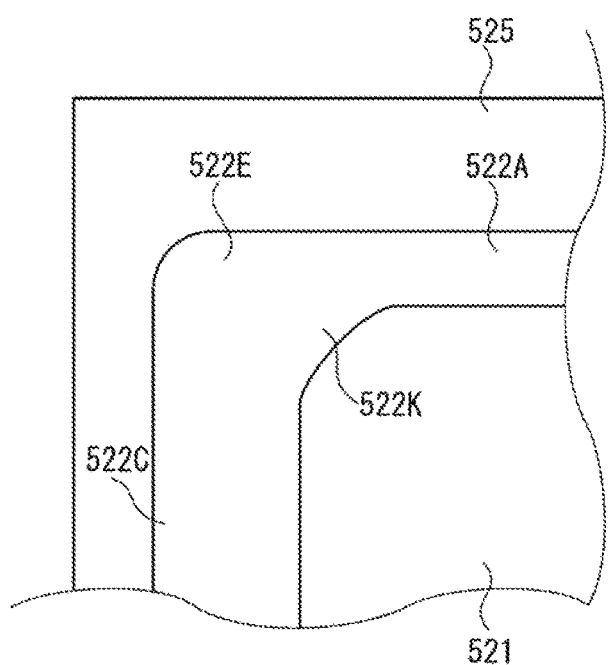
FIG. 12 is a plan view illustrating a movable substrate according to further still another embodiment of the invention.

For example, FIG. 11 illustrates the holding portion according to the fifth embodiment in which a corner portion is rounded and longitudinally extended. FIG. 12 illustrates the holding portion according to the sixth embodiment in which a corner portion is rounded.

In this way, by rounding the corner portion, it is possible to suppress the concentration of stress on a part of the holding portion.

If the movable substrate is etched to form a holding portion of which a dimension in the thickness direction is less than the movable portion 521, the holding portion in which the corner portion is rounded with the shape of an etching mask pattern can be formed.

Figure 13:
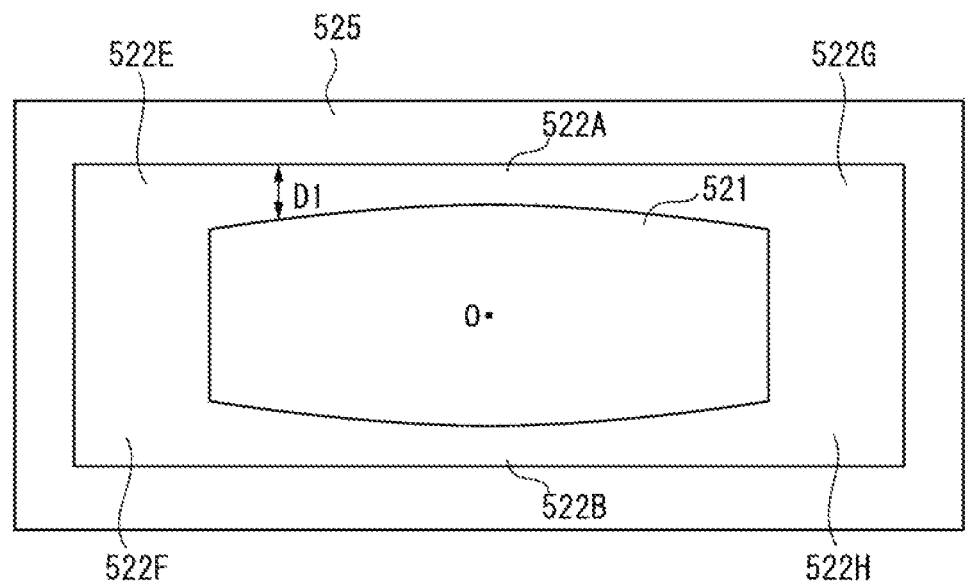
FIG. 13 is a plan view illustrating a movable substrate according to further still another embodiment of the invention.

In the foregoing second embodiment, in the long-side holding portions 522A and 522B of the movable substrate 52A, the outer circumference in contact with the substrate outer circumference portion 525 is hollowed to be curved toward the movable portion 521 in the filter plan view. Thus, the dimension D1 is gradually shortened from both ends to the center in the long-side direction, but the invention is not limited thereto. For example, as illustrated in FIG. 13, in the long-side holding portions 522A and 522B, the circumference in contact with the movable portion 521 may be hollowed to be curved toward the substrate outer circumference portion 525 in the filter plan view so that the dimension D1 is gradually shortened from both ends to the center in the long-side direction. That is, the long sides of the movable portion 521 may be curved in the filter plan view. That is, the long sides of the movable portion according to the invention may include not only straight sides but also curved sides.

Figure 14:
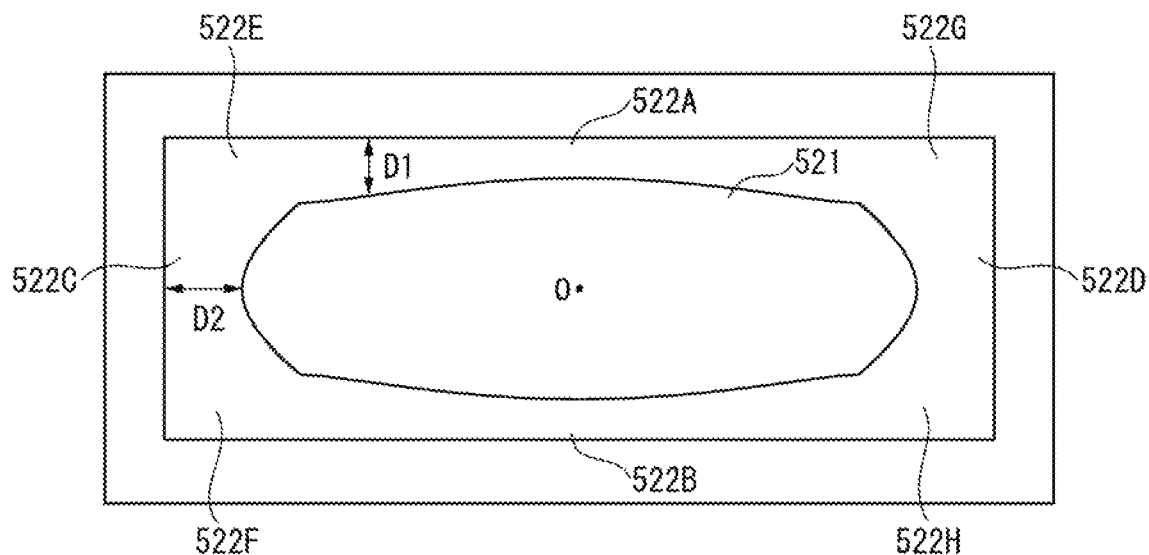
FIG. 14 is a plan view illustrating a movable substrate according to further still another embodiment of the invention.

In the foregoing third embodiment, in the short-side holding portions 522C and 522D of the movable substrate 52B, the outer circumference in contact with the substrate outer circumference portion 525 is hollowed to be curved toward the movable portion 521 in the filter plan view. Thus, the dimension D2 is gradually shortened from both ends to the center in the short-side direction, but the invention is not limited thereto. For example, as illustrated in FIG. 14, in the short-side holding portions 522C and 522D, the outer circumference in contact with the movable portion 521 may be hollowed to be curved toward the substrate outer circumference portion 525 in the filter plan view so that the dimension D2 is gradually shortened from both ends to the center in the short-side direction. That is, the short sides of the movable portion 521 may be curved in the filter plan view. That is, the short sides of the movable portion according to the invention may include not only straight sides but also curved sides.

In the foregoing fourth and fifth embodiments, the protruding holding portion may also protrude from only a part of the outer circumference of the corner holding portions 522E to 522H. However, the protruding holding portion preferably is continuous with at least one of parts of the long-side holding portions 522A and 522B and the short-side holding portions 522C and 522D since the force by which a corner portion of the movable portion 521 is drawn by the holding portion can be further weakened.

In the wavelength variable interference filter according to the foregoing first to sixth embodiments, the holding portion has the smaller dimension in the thickness direction than the movable portion 521 and supports the movable portion 521 so that the movable portion 521 can be displaced, but the invention is not limited thereto. For example, the holding portion may be formed of a material with lower rigidity than the movable portion 521 and may be more easily bent than the movable portion 521 to support the movable portion 521 so that the movable portion 521 can be displaced. Alternatively, by forming a hole in the holding portion, the holding portion may be more easily bent than the movable portion 521 so that the movable portion 521 can be displaced. That is, the holding portion may have lower rigidity than the movable portion 521.

In the foregoing first to sixth embodiments, the movable portion 521 has the rectangular shape in the filter plan view, but the invention is not limited thereto. For example, the movable portion 521 may have an elongated shape that has a major axis, such as an elliptical shape or a square shape.

When the movable portion 521 has an elongated shape, the rigidity of a minor-axis holding portion along the minor axis of the movable portion 521 is set to be lower than the rigidity of a major-axis holding portion along the major axis of the movable portion 521 in the holding portion, so that a difference between a bending amount in the major axis direction of the movable portion 521 and a bending amount in the minor axis direction of the movable portion 521 can be reduced.

When the movable portion 521 has a square shape, protruding holding portions may be formed with the corner holding portions 522E to 522H so that the movable portion 521 can be rarely bent.

In the foregoing embodiments, the light-transmissive wavelength variable interference filter that disperses light with a predetermined wavelength from incident light and transmits the light has been exemplified as the wavelength variable interference filter, but the invention is not limited thereto. For example, a light reflective wavelength variable interference filter that disperses light with a predetermined wavelength from incident light and reflects the light may be used as the wavelength variable interference filter.

In the foregoing embodiments, the fixed lead electrode 563 and the first detection electrode 541 are formed in the first terminal extraction portion 514 and the movable lead electrode 564 and the second detection electrode 551 are formed in the second terminal extraction portion 524, but the invention is not limited thereto. For example, the fixed lead electrode 563, the first detection electrode 541, the movable lead electrode 564, and the second detection electrode 551 may be formed in only one of the first terminal extraction portion 514 and the second terminal extraction portion 524.

Figure 15:
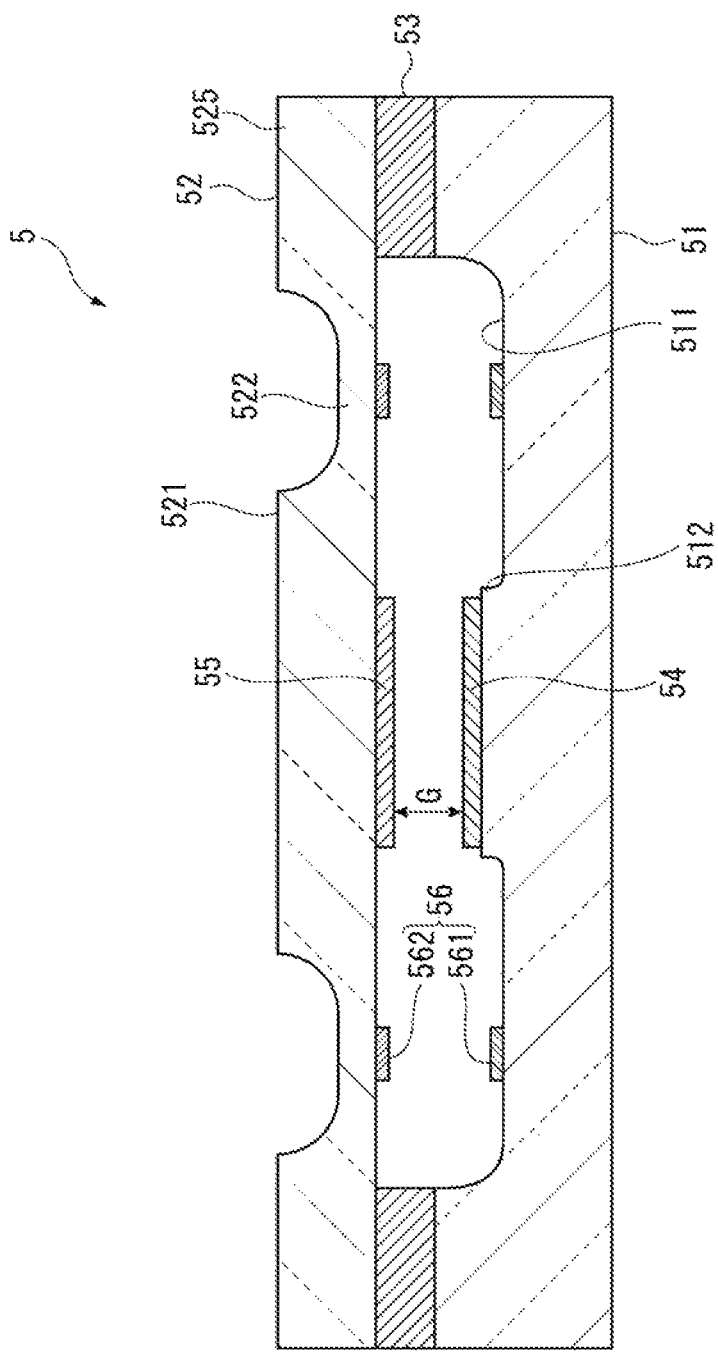
FIG. 15 is a sectional view illustrating a wavelength variable interference filter according to further still another embodiment of the invention.

In the foregoing embodiments, the movable electrode 562 is formed in the movable portion 521, but the invention is not limited thereto. For example, as illustrated in FIG. 15, the movable electrode 562 may be formed in the holding portion 522 that holds the movable portion 521. Accordingly, the area of the movable portion 521 can be further decreased. At this time, as in the foregoing embodiments, the fixed electrode 561 is formed in a region overlapping with the movable electrode 562 in the filter plan view to configure the electrostatic actuator 56.

In addition, the specific structures according to the embodiments of the invention can be appropriately changed to other structures within the scope of the invention.

What is claimed is:

1. A wavelength variable interference filter comprising:
a first substrate;
a first reflection film on the first substrate;
a second substrate opposing the first substrate, the second substrate being configured with:
a movable member that is rectangular-shaped with a long side and a short side in a plan view, the long side being longer than the short side; and
a holding member surrounding an outer circumference of the movable member and holding the movable member; and
a second reflection film on the second substrate, the second reflection film facing the first reflection film,
wherein the holding member includes a long-side holding member formed along the long side, and the holding member includes a short-side holding member formed along the short side,
a first rigidity of the short-side holding member is lower than a second rigidity of the long-side holding member, the first rigidity and the second rigidity being defined in a thickness direction of the second substrate, and
wherein the second rigidity of the long-side holding member is progressively lowered in a first direction as a distance from a normal of the long side passing through a center of the movable member increases.

2. The wavelength variable interference filter according to claim 1,
wherein the second rigidity of the long-side holding member is progressively lowered in a third direction along a major axis of the movable member as a distance from a normal of the major axis passing through a center of the movable member increases.

3. The wavelength variable interference filter according to claim 1,
wherein the first rigidity of the short-side holding member is progressively lowered in a second direction as a distance from a normal of the short side passing through a center of the movable member increases.

4. The wavelength variable interference filter according to claim 1,
wherein the first rigidity of the short-side holding member is progressively lowered in a third direction along a minor axis of the movable member as a distance from a normal of the minor axis passing through a center of the movable member increases.

5. The wavelength variable interference filter according to claim 1,
wherein the holding member further includes a corner holding member disposed between the long-side holding member and the short-side holding member in the plan view, and
wherein a rigidity of the corner holding member is lower than the second rigidity of the long-side holding member and the first rigidity short-side holding member.

6. The wavelength variable interference filter according to claim 5,
wherein the corner holding member is disposed in a region confined by a pair of lines formed along the long sides in contact with a first circumference of the long-side holding member close to the movable member and a first outer circumference opposite to the first circumference and a pair of lines formed along the short sides in contact with a second circumference of the short-side holding member close to the movable member and a second outer circumference opposite to the second circumference, and
wherein a rigidity of the corner holding member in a fourth direction angled with respect to the first direction is lower than the second rigidity of the long-side holding member and the first rigidity of the short-side holding member.

7. The wavelength variable interference filter according to claim 1,
   wherein a thickness of the short-side holding member is less than a thickness of the long-side holding member.

8. The wavelength variable interference filter according to claim 1,
   wherein a length of the short-side holding member in a longitudinally extending direction of the long side is greater than a length of the long-side holding member in a longitudinally extending direction of the short side.

9. The wavelength variable interference filter according to claim 1,
   wherein a plurality of holes are formed in the holding member, and
   wherein an opening area of the holes per unit area in the short-side holding member is greater than an opening area of the holes per unit area in the long-side holding member.

10. The wavelength variable interference filter according to claim 5,
    wherein the holding member further includes a protruding holding member that protrudes from an outer circumference of the corner holding member.

11. An optical module comprising:
    the wavelength variable interference filter according to claim 1; and
    a light receiving unit that receives light transmitted through the wavelength variable interference filter.

12. An optical module comprising:
    the wavelength variable interference filter according to claim 2; and
    a light receiving unit that receives light transmitted through the wavelength variable interference filter.

13. An optical module comprising:
    the wavelength variable interference filter according to claim 3; and
    a light receiving unit that receives light transmitted through the wavelength variable interference filter.

14. An optical module comprising:
    the wavelength variable interference filter according to claim 4; and
    a light receiving unit that receives light transmitted through the wavelength variable interference filter.

15. An optical module comprising:
    the wavelength variable interference filter according to claim 5; and
    a light receiving unit that receives light transmitted through the wavelength variable interference filter.

16. An optical module comprising:
    the wavelength variable interference filter according to claim 6; and
    a light receiving unit that receives light transmitted through the wavelength variable interference filter.

\* \* \* \* \*